Patented Nov. 16, 1943

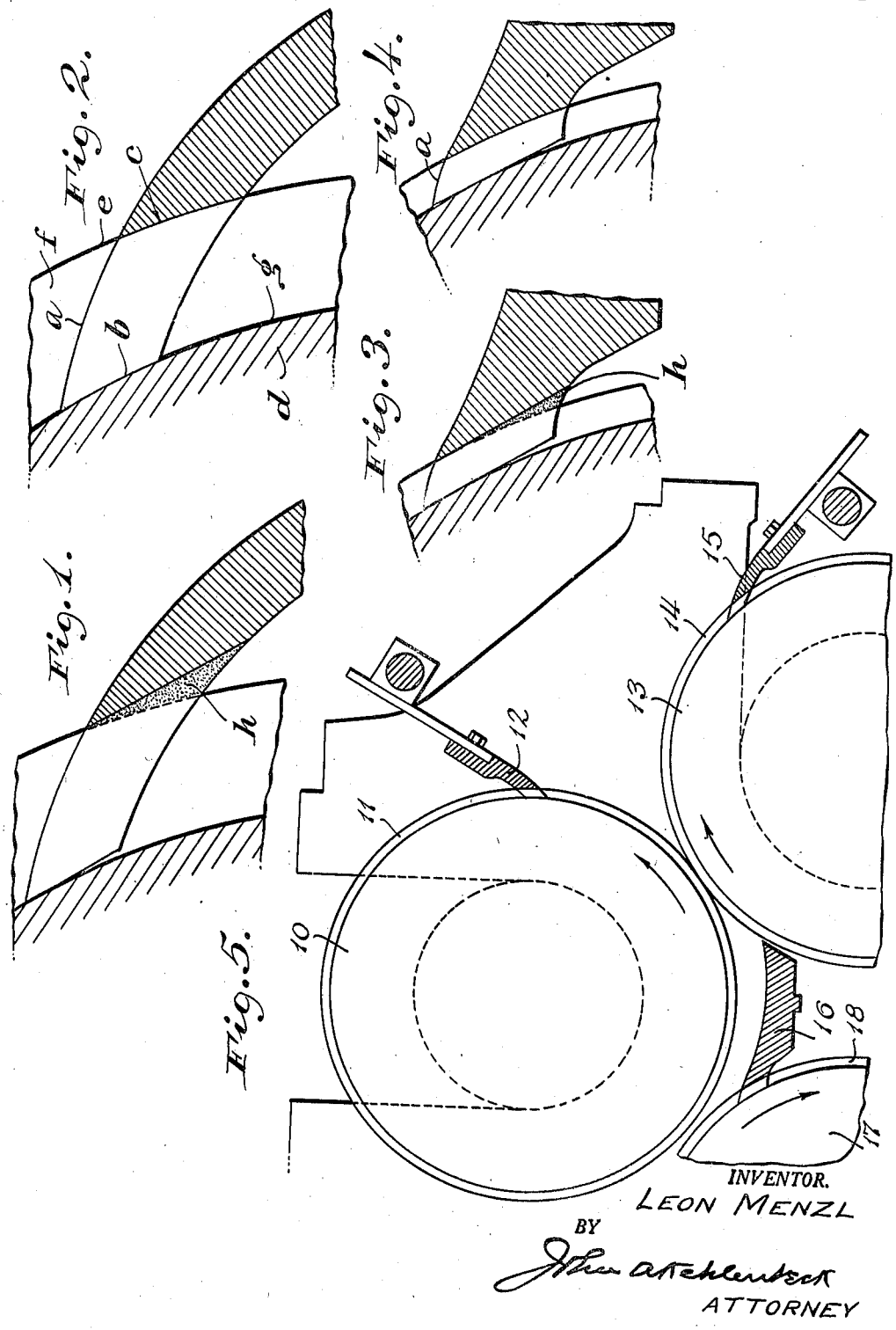

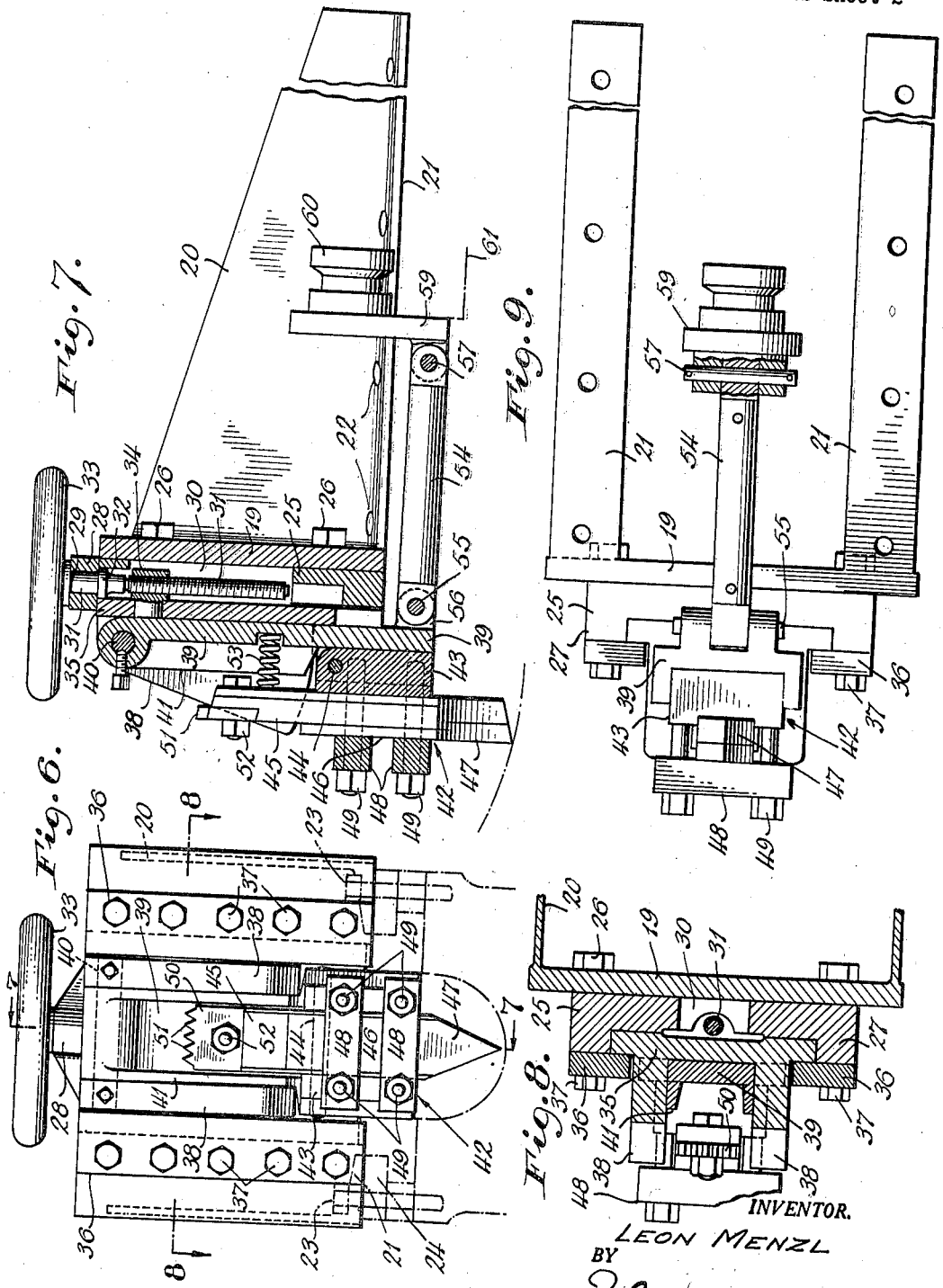

2,334,276

UNITED STATES PATENT OFFICE 2,334,276

TOOL HEAD

Leon Menzl, Crestwood, N. Y., assignor to Marlo Co., New York, N. Y., a copartnership consisting of Harold Case and Charles Gersman Application February 29, 1940, Serial No. 321,386

4 Claims. (Cl. 90—52)

The invention relates to the scraper tip and trash plate teeth for removing material from the grooved surfaces of mechanical rolls and more particularly of cane sugar mill rolls. Heretofore it has been customary to cut such teeth with a shaper tool or milling cutter advancing in straight lines whereby triangular teeth were produced having straight point lines and straight base or root lines in parallel relation to each other.

The object of the invention is to provide teeth of the indicated type in a novel form whereby operative efficiency is increased and waste of material in the cutting of said teeth is reduced to a minimum. The invention contemplates further the provision of novel apparatus whereby the novel teeth may be accurately and uniformly produced in an economical and efficient manner.

Other more specific objects will appear from the description hereinafter and the features of novelty will be pointed out in the claims.

In the accompanying drawings which illustrate examples of the invention without defining the limits thereof, Figs. 1 and 2 are diagrammatic views illustrating respectively the old form of scraper teeth and the instant novel form thereof; Figs. 3 and 4 are corresponding views respectively of the old and new trash bar plate teeth; Fig. 5 is a diagrammatic view of a cane sugar mill showing scraper bars and trash bar plate with the novel teeth in use; Fig. 6 is a front end elevation of the novel cutting apparatus; Fig. 7 is a longitudinal section thereof on the line 7—7 of Fig. 6; Fig. 8 is a horizontal section on the line 8—8 of Fig. 6, and Fig. 9 is an inverted plan view.

In this improved tooth $a$, the point line $b$ and the line at the root of the tooth or base line $c$ are preferably both curved in arcs corresponding with the radius of the mill roll $d$ with which said tooth is intended to cooperate; that is the curvature of the base line $c$ of the tooth $a$ is equal to the radius from the center of the mill roll $d$ to the peripheral surface thereof, or in other words to the point line $e$ of a given mill roll tooth $f$, and the curvature of the point line $b$ of the tooth $a$ is the same as the radius from the center of the mill roll $d$ to the base of the mill roll tooth $f$ or in other words to the root $g$ of a given groove of the mill roll $d$. In some cases, however, the point line $b$ of the tooth $a$ may be a straight line which in practice extends in approximate tangential relation to the root $g$ of the mill roll $g$ as shown in Fig. 4.

The purpose of developing the novel tooth $a$ is to provide a tooth which meshes perfectly with the grooves of the mill roll $d$; in other words, the novel tooth $a$ fits perfectly the mill roll groove at the point line $b$, the root or base line $c$, as well as at the sides of said tooth $a$.

As clearly shown in Figs. 1 and 3, it is evident that in a tooth generated by a linearly reciprocating tool, considerable material is removed at the root or base line of the tooth as indicated at $h$ with resulting excessive waste. Also a tooth thus formed at best has contact only with the side surfaces of the associated mill roll teeth and because of its straight point and base lines does not conform to the surface curvature of the mill roll or its groove at the base line thereof. As illustrated in Figs. 2 and 4, it is evident that with the novel tooth $a$ having the desired curved base line $c$ no excessive waste of material occurs and at the same time a perfect co-operating fit with the point line $e$ of the mill roll tooth and the associated groove of the mill roll is secured; if the point line $b$ of the toot $a$ is also curved, perfect fit with the base line $g$ of the mill roll groove is also attained. It will be understood that the teeth of the roll scrapers and of the trash bar plates may be correspondingly developed to include the aforesaid novel features.

In Fig. 5 which diagrammatically illustrates a cane sugar mill, 10 represents the top roll, the grooves 11 of which are cleaned by the teeth of the top roll scraper 12, and 13 indicates the side roll of said mill, the grooves 14 of the roll 13 being cleaned by the teeth of the side roll scraper 15. The trash bar plate 16 whereby the material is conducted from the front roll 17 to the side roll 13 beneath the top roll 10, has its teeth extending into meshing engagement with the grooves 18 of the front roll 17 for cleaning said grooves 18. It will be understood that the scrapers 12 and 15, and the trash bar plate 16 are mounted in proper place in the cane sugar mill in any conventional and well-known way.

The novel teeth described hereinbefore may be produced in any suitable manner and preferably are produced by the apparatus illustrated in Figs. 6 to 9 inclusive, which preferably comprises an attachment capable of being readily embodied in a conventional shaper or well-known type.

The aforesaid apparatus as shown includes an upright supporting member 19 provided with angle members extending therefrom in spaced parallel relation and consisting of upright webs 20 and horizontal flanges 21; the latter are provided at intervals with apertures 22 for the accommodation of screws or bolts 23 whereby the attachment is mounted upon the bed 24 of the shaper or equivalent machine. A base 25 is fastened to the supporting member 19 in surface engagement therewith by means of bolts 26 and includes guide ribs 27 extending lengthwise of said base 25 at opposite vertical edges thereof as shown in Figs. 8 and 9. At its upper end the base 25 carries a lug 28 fixed in place in any suitable manner and provided with an opening 29 in axial registry with a longitudinal recess 30 of the base 25, as illustrated in Fig. 7. A feed screw 31 is rotatably mounted in the opening 29 and is provided with an annular flange 32 and a hand wheel 33 which bear against opposite faces of the lug 28 to maintain the feed screw 31 against axial movement relatively to the lug 28 without interference with the rotation of said feed screw 31 in the opening 29. The hand wheel 33 is externally accessible for manually manipulating the feed screw 31 which extends inwardly of the lug 28 into the longitudinal recess 30 of the base 25, as shown in Fig. 7.

The threaded portion of the feed screw 31 is in screwthreaded engagement with an internally threaded nut 34 located in the longitudinal recess 30 and fastened in any suitable manner to a tool slide 35. The latter is slidably mounted on the base 25 between the guide ribs 27 thereof and is maintained in slidable surface engagement with said base 25 by means of retainers 36 secured on the ribs 27 by screws or the like 37, and projecting inwardly beyond said ribs 27 over the outer face of said tool slide 35 as illustrated in Fig. 8. With the described arrangement, the retainers 36 in association with the guide ribs 27 and the base 25 provide parallel spaced guideways in which the tool slide 35 is vertically movable by means of the feed screw 31 and hand wheel 33 for the purpose to be more fully set forth hereinafter.

The tool slide 35 at its upper portion includes outwardly projecting cheeks 38 located in spaced parallel relation and between which a swinging member or arm 39 is pivotally mounted by means of a pivot pin 40, said member or arm 39 having parallel side flanges 41 extending throughout part of its length in surface engagement with the inner faces of the cheeks 38, as shown in Figs. 7 and 8. At its lower end, the swinging member or arm 39 is equipped with a clapper box 42 in which a clapper block 43 is pivotally mounted by means of a pivot pin 44. The clapper block 43 is recessed to receive a tool support 45, as illustrated in Fig. 9, said tool support 45 at its lower end carrying a grooving tool 46 having a single cutting tooth 47 and fixed in place by means of straps 48 and bolts 49 which also serve to secure the tool support 45 on the clapper block 43; at its upper end the tool support 45 carries a grooving comb 50 provided with a plurality of cutting teeth 51 and fastened in place by means of a bolt 52. A spring 53 bears against the member or arm 39 and against the tool support 45 and permits the latter and the clapper block 43 to pivotally yield in one direction.

The apparatus further includes means whereby the operative parts thereof may be readily connected with the operating mechanism of the shaper for actuating the attachment in the intended manner. In the illustrated example, the means referred to consists of a push-rod 54 having its one end pivotally connected by means of a pivot pin 55 with lugs 56 projecting from the swinging member or arm 39; the opposite end of the push-rod 54 is pivotally connected by means of a pivot pin 57 with similar lugs 58 carried by a ram head 59 having a coupling member 60 whereby said ram head 59 and its associated parts are coupled to the conventional shaper ram 61 which is diagrammatically illustrated by the dotted lines in Figs. 7 and 8.

The apparatus shown in Figs. 6 to 9 inclusive, as previously stated, preferably comprises an attachment which is mounted on the shaper bed 24 in such a way that said attachment projects over the shaper table upon which the roll scraper or trash bar plate on which the teeth are to be cut is properly mounted in any suitable manner.

In order to cut the teeth $a$ so that they will fit the mill roll and the grooving thereof, the tool support 45 is adjusted on the clapper block 43 to a position in which the distance from the point of the tooth 47 of the tool 46 to the center of the pivot pin 40 is equal to the radius of the mill roll with which the particular teeth are designed to co-operate. With the tool 46 thus set in position, the feed screw 31 is actuated by means of the hand wheel 33 to raise the tool slide 35 to its high position on the supporting member 19. The operating mechanism of the shaper is then started to act on the ram head 59 and push-rod 54 in a manner to swing the member or arm 39 on the pivot pin 40 and to thereby actuate the cutting tool 46 and its tooth 47 in a cutting arc. At the finish of the initial cut the tool slide 35 is shifted downwardly by means of the feed screw 31 and hand wheel 33 to adjust the tooth 47 of the cutting tool 46 to a new cutting position. It will be understood that in the meantime the operating mechanism of the shaper has operated to swing the arm or member 39 and with it the tool 46 and its tooth 47 back to the initial position shown in Fig. 7 from which position the cutting tool is again swung in a cutting arc about the pivot pin 40 to produce a new cut. This oscillation of the swinging member or arm 39 and the cutting tool 46 on the pivot pin 40 is continued and the tool slide is periodically shifted to adjust the tooth 47 of said cutting tool to progressively advancing cutting positions. In this way the base or root lines of the teeth $a$ when fully cut are curved on radii corresponding to the radius of the mill roll with which said teeth $a$ are intended to co-operate. If the point lines of the teeth $a$ are to be correspondingly curved, the particular scraper or trash bar plate being operated on is first cut or otherwise manipulated to properly curve the surface thereof. In the operation of producing the teeth $a$, the latter in such case are cut inwardly from this curved surface.

With the novel teeth, excessive waste of material in cutting is avoided, as previously stated herein, and a perfect mesh with the grooves of the particular mill roll is effected whereby removal of material from the grooves of said mill roll is effected in a most efficient manner. The apparatus or attachment whereby the novel teeth may be produced is simple in construction and operation, and requires no particularly skilled supervision in its operation. While this apparatus is preferably constructed in the form of an attachment designed for embodiment in a conventional shaper machine, said apparatus may be otherwise arranged as an independent mechanism operated in any convenient way.

Various changes in the specific forms shown and described may be made within the scope of the claims without departing from the spirit of the invention.

I claim:

1. An apparatus for cutting the teeth of mill roll scrapers and trash bar plates comprising an upright supporting member, an upright base fixed on an upright face of said supporting member and provided with a longitudinal recess, a vertically movable tool slide slidably mounted on said base, a swinging arm pivotally mounted on said tool slide, a clapper block pivotally mounted on said swinging arm, a tool support on said clapper block, a tooth cutting tool fixed on said tool support, means for pivotally actuating said swinging arm to operate said cutting tool in cutting arcs concentric to the pivot of said swinging arm, a feed screw rotatably mounted on said base and extending into the longitudinal recess thereof, a nut secured on said tool slide in threaded engagement with said feed screw, and a handwheel for rotating said feed screw relatively to said nut whereby said tool slide is vertically shifted relatively to said base to adjust said cutting tool to progressively advancing cutting positions.

2. An apparatus for cutting the teeth of mill roll scrapers and trash bar plates comprising upright supporting means, cutting means pivotally mounted on said supporting means and slidably movable relatively thereto in vertical directions, a reversible tool support pivotally mounted on said cutting means and partaking of the pivotal and sliding movements thereof, said reversible tool support being adapted to carry cutting implements at its opposite ends and to selectively set either of said cutting implements in operative position, means for pivotally actuating said cutting means to operate the active cutting implement in cutting arcs concentric to the pivot of said cutting means, and means for shifting said cutting means relatively to said supporting means in vertical directions whereby the cutting implement operative at the time is adjusted to progressively advancing cutting positions.

3. An attachment for shapers comprising supporting means adapted for mounting on the shaper bed, a tool slide slidably mounted on said supporting means, a tooth cutting device pivotally mounted on said tool slide, actuating means connected with said tooth cutting device adapted for connection with the operating mechanism of said shaper whereby said tooth cutting device is pivotally actuated to operate said cutting device in cutting arcs concentric to its pivot, and means for slidably shifting said tool slide on said supporting means to adjust said cutting device to progressively advancing cutting positions.

4. An attachment for shapers comprising supporting means adapted for mounting on the shaper bed, tooth cutting means including a cutting tool slidably and pivotally mounted on said supporting means, actuating means adapted for connection with the operating mechanism of said shaper whereby said tooth cutting means is pivotally operated to actuate said cutting tool in cutting arcs, and means for slidably shifting said cutting tool to progressively advancing cutting positions.

LEON MENZL.